US012712818B2

(12) United States Patent
Zeng

(10) Patent No.: US 12,712,818 B2
(45) Date of Patent: Aug. 18, 2026

(54) AUDIO PLAYBACK CONTROL METHOD, DEVICE AND ELECTRONIC EQUIPMENT

(71) Applicant: Beijing Zitiao Network Technology Co., Ltd., Beijing (CN)

(72) Inventor: Fanzhi Zeng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 192 days.

(21) Appl. No.: 18/632,002

(22) Filed: Apr. 10, 2024

(65) Prior Publication Data

US 2024/0340331 A1 Oct. 10, 2024

(30) Foreign Application Priority Data

Apr. 10, 2023 (CN) ........................ 202310376606.4

(51) Int. Cl.
*H04L 47/283* (2022.01)
*H04L 65/75* (2022.01)
*H04L 65/80* (2022.01)

(52) U.S. Cl.
CPC .......... *H04L 47/283* (2013.01); *H04L 65/765* (2022.05); *H04L 65/80* (2013.01)

(58) Field of Classification Search
CPC ..... H04L 65/765; H04L 47/283; H04L 65/80; H04L 49/9023; H04L 43/0858; H04L 65/752; Y02D 30/70
See application file for complete search history.

(56) References Cited

U.S. PATENT DOCUMENTS 6,360,271 B1 * 3/2002 Schuster ............... H04L 49/206 710/52
6,657,954 B1 * 12/2003 Bird ........................ H04L 47/10 370/465
8,279,884 B1 * 10/2012 Narasimha ........... H04L 47/365 370/410
8,937,963 B1 * 1/2015 Narasimha ............. H04L 47/22 370/410

(Continued)

FOREIGN PATENT DOCUMENTS

CN 101924683 A 12/2010
JP 2005322995 A * 11/2005

OTHER PUBLICATIONS

Chinese Patent Application No. 202310376606.4; Office Action dated Apr. 11, 2025, 17 pages with machine translation.

*Primary Examiner* — Oanh Duong
(74) *Attorney, Agent, or Firm* — BakerHostetler

(57) ABSTRACT

This specification embodiments discloses an audio playback control method, device and electronic equipment, which can make audio playback more stable, reduce lagging rate and frequent acceleration and deceleration, and the like, while ensuring that the delay is not degraded. The method comprises: receiving an audio data packet sent by a sender through a target network and caching it to a jitter buffer to wait for a player to play; estimating a target delay of the target network based on an inter-arrival time IAT of the audio data packet sent by the sender; determining a target playback strategy of the player for the audio data playback, based on the target delay of the target network and an actual cached data amount of the jitter buffer; obtaining an audio data from the jitter buffer and playing through the player, based on the target playback strategy.

19 Claims, 4 Drawing Sheets

(56) References Cited

U.S. PATENT DOCUMENTS

| | | | | |
|---|---|---|---|---|
| 9,246,545 | B1 * | 1/2016 | Ayrapetian | H04B 3/23 |
| 10,135,707 | B2 * | 11/2018 | Sung | H04J 3/0632 |
| 12,462,830 | B2 * | 11/2025 | Liu | G10L 21/043 |
| 2007/0211625 | A1 * | 9/2007 | Liu | H04L 47/25<br>370/431 |
| 2009/0240826 | A1 * | 9/2009 | LeBlanc | H04L 65/80<br>709/231 |
| 2010/0290454 | A1 * | 11/2010 | Lundberg | H04J 3/0632<br>370/352 |
| 2010/0302960 | A1 * | 12/2010 | Bjorken | H04L 1/0003<br>370/252 |
| 2014/0072000 | A1 * | 3/2014 | Shiva | H04W 28/02<br>370/516 |
| 2014/0135027 | A1 * | 5/2014 | Kodali | H04W 72/20<br>455/452.1 |
| 2014/0146695 | A1 * | 5/2014 | Kim | H04L 43/087<br>370/252 |
| 2016/0267919 | A1 * | 9/2016 | Cao | G10L 19/167 |
| 2017/0104552 | A1 * | 4/2017 | Sun | H03M 13/353 |
| 2017/0201443 | A1 * | 7/2017 | Sung | H04L 43/0835 |
| 2020/0089468 | A1 * | 3/2020 | Tull | H04R 5/02 |
| 2020/0266839 | A1 * | 8/2020 | Mani | H04L 47/283 |
| 2021/0150393 | A1 * | 5/2021 | Johansson | H04L 65/80 |

* cited by examiner

AUDIO PLAYBACK CONTROL METHOD, DEVICE AND ELECTRONIC EQUIPMENT

This disclosure claims the priority of the Chinese patent application number 202310376606.4 filed on Apr. 10, 2023, with the application name "AUDIO PLAYBACK CONTROL METHOD, DEVICE AND ELECTRONIC EQUIPMENT", which is incorporated herein by reference in its entirety.

FIELD

The present disclosure relates to the field of communication technology, and in particular, to an audio playback control method, device and electronic equipment.

BACKGROUND

In order to combat weak network jitter, current real-time audio products generally add the cache at the receiver to alleviate the lag brought about by network jitter, as well as fast and slow playback. Generally speaking, a target delay is estimated based on network jitter, and then the data amount to be cached is determined based on the target delay, and then it is decided whether to fast forward and slow playback, packet loss compensate, and generate comfortable noise, etc., so that the amount of cached data is close to the target delay.

However, the above solution does not combine the network changes to decide how to play, when the network changes rapidly, it is easy to cause inaccurate playback control, resulting in phenomena such as unstable audio playback, lagging, frequent acceleration and deceleration, etc., and affecting final the audio playback effect.

SUMMARY

It is an object of the embodiments of the present specification to provide an audio playback control method, device and electronic equipment, so as to make the audio playback more stable and reduce the lagging rate and frequent acceleration and deceleration and the like while ensuring that the delay is not degraded.

In order to realize the above object, the embodiments of the present specification adopt the following technical solutions:

The first aspect provides a method of audio playback, comprising:

Receiving an audio data packet sent by a sender through a target network and caching it in a jitter buffer to wait fora player to play;

Estimating a target delay of the target network based on an inter-arrival time IAT of the audio data packet sent by the sender;

Determining a target playback strategy of the player for audio data playback, based on the target delay of the target network and the actual cached data amount of the jitter buffer;

Obtaining an audio data from the jitter buffer and playing through the player, based on the target playback strategy.

In a second aspect, a apparatus for audio playback control is provided, including:

A receiving unit, configured to receive an audio data packet sent by a sender through a target network and cache it in a jitter buffer to wait for a player to play;

An estimation unit, configured to estimate a target delay of the target network based on an inter-arrival time IAT of the audio data packet sent by the sender;

A strategy determination unit, configured to determine a target playback strategy of the player for the audio data playback based on the target delay of the target network and the actual cached data amount in the jitter buffer;

A playback unit, configured to obtain the audio data from the jitter buffer and play it through the player based on the target playback strategy.

In a third aspect, an electronic device is provided, comprising:

A processor; and

A memory arranged to store computer-executable instructions that, when executed, cause the processor to:

Receive an audio data packet sent by a sender through a target network and cache it in a jitter buffer to wait for a player to play;

Estimate a target delay of the target network based on an inter-arrival time IAT of the audio data packets sent by the sender;

Determine a target playback strategy of the player for audio data playbacks based on the target delay of the target network and the actual cached data amount of the jitter buffer;

Obtain the audio data from the jitter buffer and play it through the player based on the target playback strategy.

A fourth aspect provides a computer-readable storage medium, the computer-readable storage medium stores one or more programs, when the one or more programs executed by an electronic device including a plurality of application programs, causes the electronic device perform the following operations:

Receive an audio data packet sent by a sender through a target network and cache it in a jitter buffer to wait for a player to play;

Estimate a target delay of the target network based on an inter-arrival time IAT of the audio data packets sent by the sender;

Determine a target playback strategy of the player for audio data playbacks based on the target delay of the target network and the actual cached data amount of the jitter buffer;

Obtain the audio data from the jitter buffer and play it through the player based on the target playback strategy.

It can be seen from the technical solutions provided by the above embodiments of the present specification, that the technologies solutions provided by the embodiments of the present specification have at least one of the following technical effects: the receiver takes the network quality of service (QOS) as the starting point, and determines a target playback strategy of the player for the audio data playback, based on the target delay of the target network and an actual cached data amount in the jitter buffer and then obtain an audio data from the jitter buffer and playing through the player, based on the target playback strategy; due to the target delay and the actual cached data amount of the jitter buffer can reflect the changes in the weak network of the target network, based on these two, performing the audio playback control to cause the audio playback process adaptable to the subtle changes of the weak network, thereby upon ensuring that there is no degradation of the delay, reducing the audio lag rate and frequent acceleration and deceleration, thereby improving the overall stability of the audio playback.

BRIEF DESCRIPTION OF THE DRAWINGS

The accompanying drawings illustrated herein are used to provide a further understanding of the present specification and constitute a part of the present specification, and the schematic embodiments and descriptions of the present specification are used to explain the present specification and do not constitute an improper limitation of the present specification. In the accompanying drawings.

DETAILED DESCRIPTION

Figure 1A:
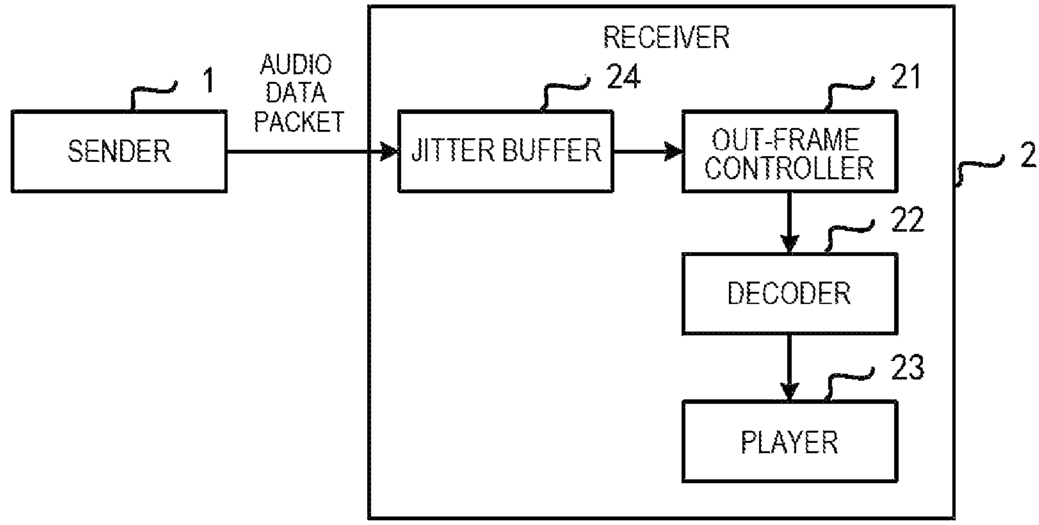
FIG. 1A is a schematic diagram of an application scenario of a method of audio playback control provided by an embodiment in this specification.

In order to make the purpose, technical solutions and advantages of this specification more clear, the technical solutions of this specification will be described clearly and completely in the following in conjunction with specific embodiments of this specification and the corresponding accompanying drawings. Obviously, the described embodiments are only a part of the embodiments in this specification, not all of the embodiments. Based on the embodiments in this specification, all other embodiments obtained by those of ordinary skill in the art without making creative work should fall within the scope of protection of this document.

It should be understood that the various steps described in the method embodiments of this document can be performed in a different order and/or in parallel. Furthermore, method embodiments may include additional steps and/or omit performance of illustrated steps. The scope of this document is not limited in this respect.

The term "includes" and its variations used in this document are open-ended, i.e. "including but not limited to". The term "based on" means "based at least in part on". The term "an embodiment" means "at least one embodiment"; the term "another embodiment" means"at least one further embodiment"; and the term "some embodiments" means "at least some embodiments". Relevant definitions of other terms will be given in the description below.

It should be noted that the concepts of "first" and "second" mentioned in this document are only used to distinguish between different devices, modules or units, and are not intended to limit the order or interdependence of the functions performed by these devices, modules or units.

It should be noted that the modifiers "one" and "a plurality of" mentioned in this document are schematic and not restrictive, and those skilled in the art should understand that unless explicitly stated otherwise in the context, it should be understood as "one or more".

The names of the messages or information interacting between the plurality of devices in the embodiments of this document are used for illustrative purposes only and are not used to limit the scope of these messages or information.

As BACKGROUND mentioned, in order to combat weak network jitter, caching is generally added at the receiver to alleviate the lagging as well as fast and slow playback caused by network jitter. Generally speaking, a target delay is estimated based on network jitter, and then the data amount to be cached is determined based on the target delay, and then it is determined whether the playback is fast-forwarded and slow-played, compensates for packet loss, and generates a comfortable noise, so that the amount of cached data is close to the target delay. However, the above program does not combine the network changes to determine how to play, when the network changes rapidly, it is easy to cause an inaccurate playback control, resulting in the audio playback is not smooth, lagging, occurs frequent acceleration and deceleration, and so on phenomena, and ultimately affect the audio playback.

In view of this, the purpose of this specification embodiment is to provide a method of audio playback control. The receiver takes the network quality of service as the starting point, and determines a target playback strategy of the player for the audio data playback, based on the target delay of the target network and an actual cached data amount of the jitter buffer and then obtain an audio data from the jitter buffer and playing through the player, based on the target playback strategy; due to the target delay and the actual cached data amount of the jitter buffer can reflect the changes in the weak network of the target network, based on these two performing the audio playback control to cause the audio playback process adaptable to the subtle changes of the weak network, thereby upon ensuring that there is no degradation of the delay, reducing the audio lag rate and frequent acceleration and deceleration, thereby improving the overall stability of the audio playback.

The technical solutions provided by each embodiment of this specification will be described in detail below in conjunction with the accompanying drawings.

The method of audio playback control provided by embodiments in this specification can be applied to the scenario shown in FIG. 1A, which includes the sender 1 and the receiver 2.

The sender 1 is used to collect the audio data to be played, encode the audio data and package it into a RTP packet (i.e., audio data packet) and send it to the receiver 2. The receiver 2 is set with an out-frame controller 21, a decoder 22 and a player 23. The out-frame controller 21 sends the audio data packet sent by the sender 1 to the decoder 22, which decodes it and sends it to the player 23 for playing.

During the audio playback process, especially in real-time audio playback scenarios such as video conferencing and live broadcasts, there may be network delay jitter, that is, the transmission duration of two adjacent audio data packets is different, which will affect the smoothness of audio playback. In order to solve the problem of network delay jitter, the receiver 2 also sets up a jitter buffer (Jitter Buffer) 24. In this case, the audio data packets sent by the sender 1 are first cached in the jitter buffer 24, and the out-frame controller 21 smoothly acquires the audio data from the jitter buffer 24 and send it to the decoder 22 for decoding. The decoded audio data is then played by the player 23.

Figure 1B:
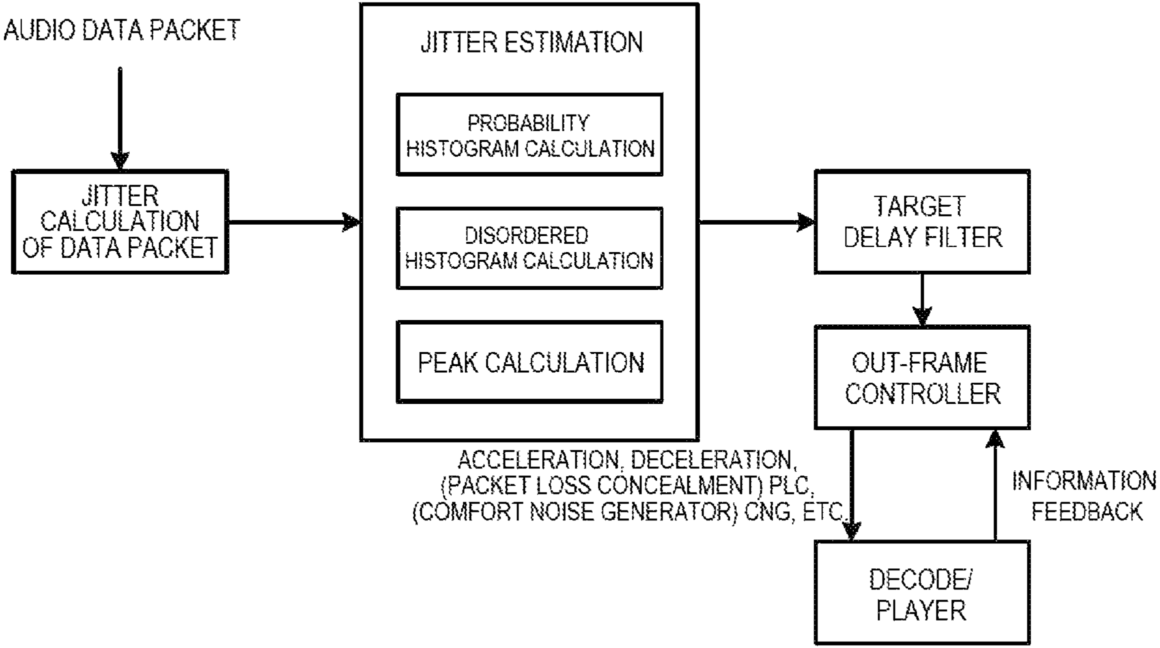
FIG. 1B is a schematic diagram of an application scenario of a method of audio playback control provided by another embodiment of this specification.

Specifically, as shown in FIG. 1B, the out-frame controller 21 performs jitter calculation based on each audio data packet, and then employs various algorithms such as probability histogram calculation method, disordered histogram calculation method, and peak calculation method, based on each audio data packet, and the estimated network delay is smoothly filtered by a target delay filter to obtain the target delay used to represent the network delay (target_level); then, the out-frame controller 21 may determine a target playback strategy for audio playback by the player 23 based on the target delay and the actual cached data amount in the jitter buffer 24, such as acceleration, deceleration, Packet Loss Concealment (PLC), Comfort Noise Generator (CNG), etc., as well as based on the target playback strategy, controlling the decoder 22 to obtain audio data from the jitter buffer 24 and decode it and send it to the player 23 for playback by the player 23; further, the out-frame controller 21 also adjusts the target playback strategy based on the audio playback information fed back by the player 23. As a result, the audio lag rate and frequent acceleration and deceleration are reduced, and the stability of the audio playback is improved while ensuring that the delay is not deteriorated.

The method of audio playback control provided by embodiments in this specification will describe in detail the process of the out-frame controller 21 estimating the network delay and obtaining audio data from the jitter buffer 24 and playing audio data.

Figure 2:
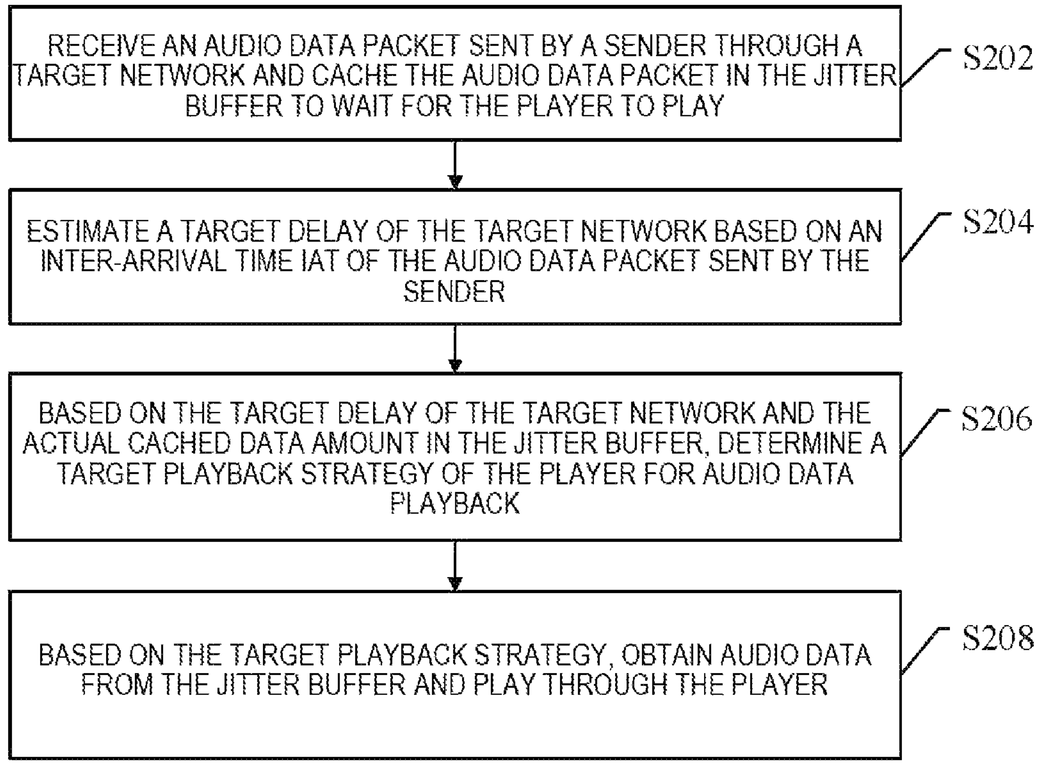
FIG. 2 is a schematic flowchart of a method of audio playback control provided by an embodiment of this specification.

Based on the application scenario shown in FIG. 1, this specification embodiment provides an audio playback control method. Referring to FIG. 2, which is a schematic flowchart of a method of audio playback control provided for an embodiment of this specification. This method can be applied to the receiver, and specifically can be applied to the out-frame controller provided in the receiver, the method can comprise:

S202: Receive an audio data packet sent by a sender through a target network and cache it in the jitter buffer to wait for the player to play.

Among them, the target network refers to the network used by the sender to send the audio data packet.

In practical applications, for each audio data packet received from the sender, the receiver temporarily caches the audio data packet into the jitter buffer and monitors in real time the actual amount of cached data in the jitter buffer. It is worth noting that the so-called "real-time" in the embodiments of this specification refers to the short duration between two monitoring intervals, for example, after each audio data packet is received by the receiver and cached in the jitter buffer, the actual amount of cached data in the jitter buffer is recorded.

S204: Estimate a target delay of the target network based on an inter-arrival time IAT of the audio data packet sent by the sender.

Among them, the IAT of two audio data packets refers to the difference between the transmission duration of the two audio data packets on the target network, the transmission duration of the audio data packet on the target network refers to the interval between the transmission timestamp and the reception timestamp of the audio packet.

The target delay is used to reflect the delay of the target network. Due to the influence of the delay of the target network, the audio data packet will generate delays, jitter, etc., during network transmission, which in turn causes the time of arrival of the audio data packet at the jitter buffer to change and thus, the receiver, when caching the audio data packet to the jitter buffer, may estimate the delay of the target network based on the arrival time of the audio data packet's arrival time of a arrival time interval to obtain the target delay.

In practical applications, for the above S204, the target delay of the target network in the first historical time period can be estimated periodically based on the IAT of the audio data packet sent by the sender based on the predetermined interval time, wherein, the first historical time period refers to a historical time period before the current decision-making moment, such as a time period between the current decision-making moment and the previous decision-making moment. The target delay of the target network in the first historical time period is used to represent the delay situation of the target network in the first historical time period.

Optionally, considering that the target delay fluctuates greatly and is not smooth enough, it may cause frequent acceleration and deceleration during the audio playback, and may also affect the frame out timing after severe lag, resulting in an intensification of the lag. In order to obtain a smooth target delay and effectively reduce frequent acceleration and deceleration and freezing rates during the audio playback process, the above S204 may comprise the following steps:

At S241, based on the plurality of predetermined delay estimation algorithms and the IAT of the audio data packet received by the jitter buffer during the first historical time period, determine the estimated delays corresponding to the plurality of predetermined delay estimation algorithms.

Among them, the plurality of predetermined delay estimation algorithms may, for example, comprise, but are not limited to: a probability histogram calculation method, a disordered histogram calculation method, and a peak calculation method. Each of the delay estimation algorithms is described in detail below.

(1) Probability Histogram Calculation Method

First, for each audio data packet received by the jitter buffer within the first historical period, based on the respective transmission duration of the audio data packet and the previous audio data packet in the target network, it can be determined that the audio data packet is relative to the previous audio data packet, which is called the positive sequence IAT of the audio data packet. For example, assuming that the sending timestamps of an audio data packet packet1 and the previous audio data packet packet2 are rtp_ms and last_rtp_ms respectively, and the receiving timestamps are rev_ms and last_rev_ms respectively, then the positive sequence IAT of the audio data packet packet1 can be calculated by the following formula:

$$iat\_delay\_ms=(rev\_ms-rtp\_ms)-(last\_rev\_ms-last\_rtp\_ms)=(rev\_ms-last\_rev\_ms)-(rtp\_ms-last\_rtp\_ms).$$

Figure 3A:
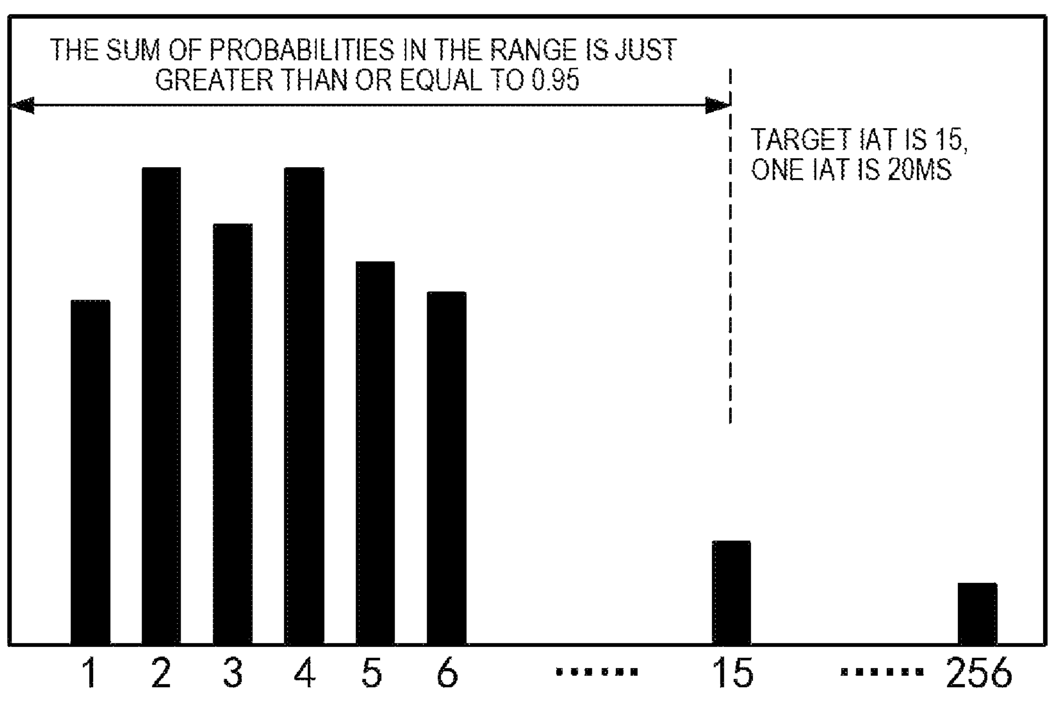
FIG. 3A is a schematic diagram of a probability histogram calculation method provided by an embodiment of this specification.

Then, for each positive order IAT of an audio data packet calculated, the positive sequence IAT of the audio data packet is inserted into the probability histogram, and the probability of each positive sequence IAT in the probability histogram is updated, as shown in FIG. 3A, the long black bar represents the positive sequence IAT of each audio data packet, and the sum of the probabilities of various positive sequence IATs is 1.

Further, finally, the 95% percentile in the probability histogram is taken as the estimated delay corresponding to the algorithm, that is, 95% of the positive sequence IATs are less than the estimated delay. For example, as shown in FIG. 3A, assuming that the 95% percentile in the probability histogram is the 15th positive sequence IAT, and assuming that each positive sequence IAT is 20 ms, then the estimated delay corresponding to this algorithm can be determined to be 15×20 ms=300 ms.

(2) Disordered Histogram Calculation Method

First, for each audio data packet received by the jitter buffer during the first historical time period, based on the respective transmission durations of the audio data packet and the audio data packet with the largest sequence number during the first historical time period in the target network, the IAT of the audio packet relative to the audio packet of the largest ordinal number may be determined, which is called the disordered IAT of the audio data packet. For example, assuming that the sending timestamps of an audio data packet packet1 and the audio data packet packet_max with the largest sequence number are rtp_ms and max_rtp_ms respectively, and the receiving timestamps are rev_ms and max_rev_ms respectively, then, the disordered IAT of the audio data packet packet1 can be calculated by the following formula:

iat_delay_ms=(rev_ms-rtp_ms)−(max_rev_ms-max_rtp_ms)=(rev_ms-max_rev_ms)−(rtp_ms-max_rtp_ms).

Figure 3B:
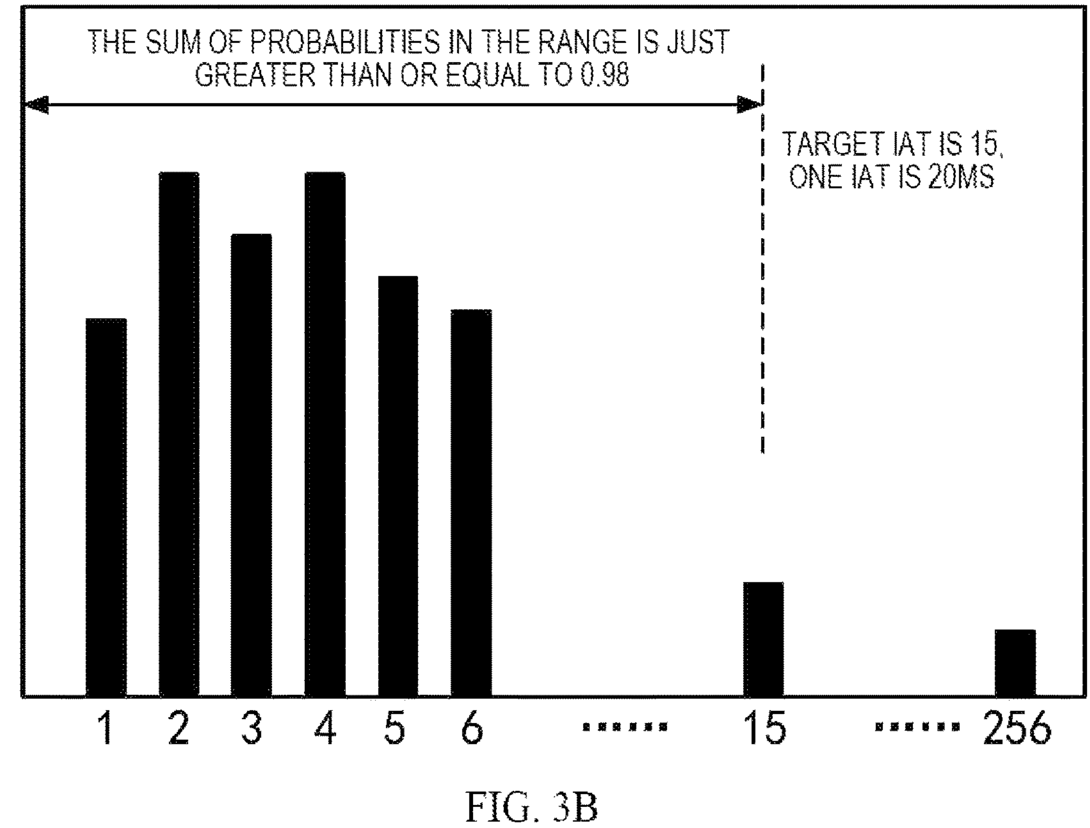
FIG. 3B is a schematic diagram of a disordered histogram calculation method provided by an embodiment of this specification.

Then, for each calculated disordered IAT of an audio packet, the disordered IAT of the audio data packet is inserted into the disordered histogram, and the probability of each disordered IAT in the disordered histogram is updated, as shown in FIG. 3B, where the long black bar represents the disordered IAT of various audio data packet.

Further, finally, the 98% percentile in the disordered histogram is taken as the estimated delay, that is, 98% of the disordered IATs are less than the estimated delay. For example, as shown in FIG. 3B, assuming that the 98% percentile in the probability histogram is the 15th disordered IAT, and assuming that each disordered IAT is 20 ms, then the estimated delay corresponding to this algorithm can be determined to be 15×20 ms=300 ms.

(3) Peak Calculation Method

After the IAT of each audio data packet received during the first historical time period through the probability histogram calculation method and the estimated delay corresponding to the probability histogram calculation method, a peak detector is utilized to detect whether or not the IAT of the audio data packet is a peak IAT, and if yes, a peak interval time of the peak IAT is calculated, wherein the peak interval time (peak_period) of the peak IAT refers to the interval between the reception timestamp of the audio packet to which this IAT belongs and the reception timestamp of the audio packet to which the previous peak IAT belongs; further, determine whether the peak IAT and its peak interval time satisfy the predetermined valid condition, and if yes, determine the peak IAT is a valid peak IAT and store it in the peak container peak_history, otherwise, the peak IAT is determined as an invalid peak IAT, wherein the predetermined valid condition comprise: the peak IAT is greater than the estimated delay corresponding to the probability histogram calculation method or greater than two times the estimated delay corresponding to the probability histogram calculation method, and the peak interval time of this IAT is less than the first predetermined peak interval time (such as 10000 ms).

Then, for each peak IAT, if the peak IAT is a valid peak IAT and the number of IATs recorded in the peak container peak_history is greater than 2, the largest IAT is found from the peak container peak_history as the estimated delay corresponding to the peak calculation method; if the peak IAT is an invalid peak IAT and the peak container peak_history is an invalid peak IAT, and the number of IATs recorded in the peak container peak_history is greater than 2, and the peak interval time of the peak IAT is less than two times the maximum peak interval time recorded in the peak container peak_history, then the largest IAT is found out from the peak container peak_history, and is used as the estimated delay time corresponding to the peak calculation method.

Figure 3C:
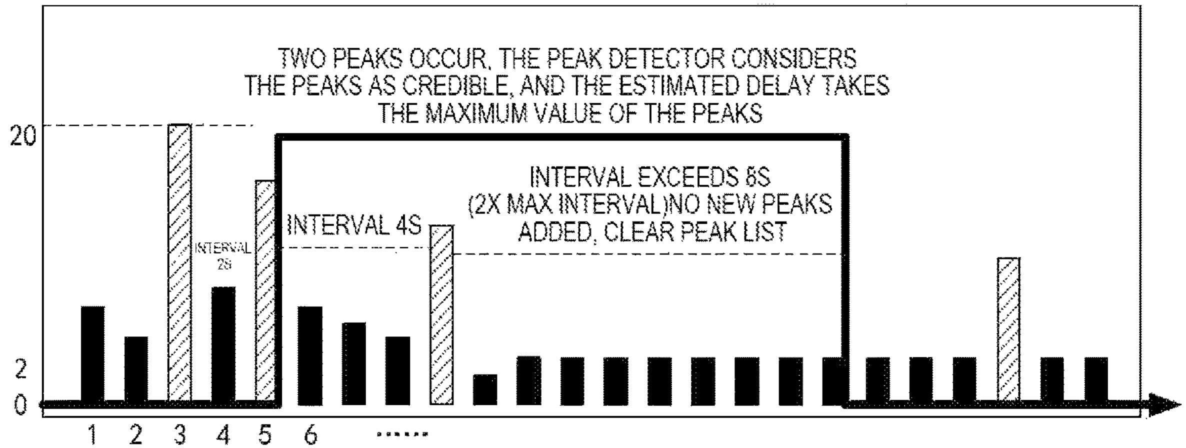
FIG. 3C is a schematic diagram of a peak calculation method provided by an embodiment of this specification.

For example, as shown in FIG. 3C, the long bar filled with black represents non-peak IAT, and the long bar filled with a diagonal line indicates a peak IAT, and the estimated delay corresponding to the peak calculation method as indicated by the thick solid black line can be determined in the above manner.

S242: Determine the target delay of the target network in the first historical time period based on the maximum value of the estimated delays corresponding to a plurality of predetermined delay estimation algorithms.

Specifically, in order to ensure the smoothness of the target delay, after determining the maximum value among the plurality of estimated delays, the maximum value can be filtered, and the filtered maximum value can be used as the target delay of the target network at the first historical time.

More specifically, the filtering processing of the above maximum value can be implemented in the following ways:

Scenario 1: The Delay of the Target Network Rises

If the above maximum value is greater than the target delay of the second historical time period, wherein the second historical time period comprises the historical time period before the last decision moment, such as a time period between the last decision moment and its previous decision moment, then it indicates that the delay of the target network rises. In this case, in order to reduce the freezing rate as much as possible, in the above S242, it can be determined whether there is packet loss in the jitter buffer in the first historical time period, and the packet loss detection result is obtained; further, based on the packet loss detection result, the above maximum value and the actual amount of cached data in the jitter buffer in the first historical time period to determine the target delay in the first historical time period.

For the packet loss detection in the jitter buffer, various packet loss detection methods commonly used in this field can be used, which will not be described in detail here.

For the determination of the target delay, if there is a packet loss in the jitter buffer in the first historical time period, the above maximum value is determined as the target delay in the first historical time period. In this way, the target delay is obtained to be smooth and large in length, and subsequent out-frame playback decisions are made based on the target delay, which can avoid too many small freezes.

If the jitter buffer does not have packet loss in the first historical time period, the product of the above maximum value and the predetermined coefficient is determined as the target delay time of the first historical time period, wherein the predetermined coefficient is a value greater than 0 and less than 1. In practice, the above maximum value may be slowly weighted according to the predetermined coefficient to gradually approximate the above maximum value. In this way, the target delay time is obtained to be smooth and of moderate length, and subsequent out-of-frame playback decisions based on the target delay time can avoid triggering a large lag during the stretching of audio data.

If the actual cache quantity of the first historical time period is greater than or equal to the above mentioned maximum value, the minimum value between the actual cache data quantity of the jitter buffer in the first historical time period and the above maximum value is determined as the target delay time of the first historical time period. In this way, the target delay time is obtained to be smooth and of moderate length, and subsequent out-of-frame playback decisions based on this target delay time can avoid first accelerating and then accelerating during audio playback, and improve the user's viewing experience.

Scenario 2: The Latency of the Target Network Decreases

If the above maximum value is less than or equal to the target delay of the above second historical time period, it indicates that the delay of the target network rises. In this case, in order to ensure that the target delay is as smooth as possible, in the above-described S242, the target delay of the first historical time period may be determined based on the target delay of the second historical time period, the interval between the last decision moment and the current decision moment, and the predetermined delay drop rate.

For example, assuming that the predetermined delay decrease rate is 5% per second, then the delay change amount can be determined based on the interval between the previous decision moment and the current decision moment and the predetermined delay decrease rate; further; the difference between the target delay and the delay change amount in the second historical time periods is determined as the target delay in the first historical time period.

The embodiments of this description here show a specific implementation of the above step 204.

Of course, it should be understood that step S204 can also be implemented in other ways, such as estimate time delay calculated using any one of the probability histogram calculation method, the disordered histogram calculation method, and the peak calculation method, which is used as the target delay, etc., the embodiments in this specification do not limit this.

At S206, determine a target playback strategy of the player for audio data playback, based on the target delay of the target network and the actual cached data amount in the jitter buffer.

Among them, the target playback strategy refers to a strategy for controlling the player to play audio data, which may include but is not limited to at least one of the following operations: accelerated playback, decelerated playback, packet loss compensation, comfortable noise generation, etc.

In practical applications, for the above S206, a target playback strategy for the player to perform audio data playback at the current decision moment may be determined periodically in accordance with a predetermined interval based on a target delay of the target network in the above first historical time period and an actual amount of cached data of the jitter buffer at the first historical time period.

Optionally, considering that the target delay of the first historical time period obtained through the above S204 is a smooth value, when the network changes rapidly, it is easy to cause the acceleration and deceleration control during the audio playback process to be inaccurate and not rapid, and thus affecting the user's viewing experience, in view of which, in the above-described S206, the player may periodically determine an operation for the audio data playback, based on the target delay of the target network in the above-described first historical time period and the actual amount of cached data in the jitter buffer in the first historical time period, deciding whether to control the player to accelerate playback of the audio, decelerate playback of the audio, and perform operations such as packet loss compensation.

Specifically, the above S206 may comprise the following steps:

Step A1: Periodically determine the change information of cached data of the jitter buffer in the first historical time period based on the actual cached data amount in the jitter buffer in the first historical time period.

Step A2: If the actual cached data amount, the change information of cached data and the target delay in the first historical time period satisfy the predetermined acceleration condition, it is determined that the target playback strategy comprises accelerated playback.

Among them, the predetermined acceleration conditions comprise at least one of the following conditions:

Condition 1: The actual cached data amount (buffer_ms) in the first historical period is greater than the predetermined maximum cached data amount in the jitter buffer (0.75*max_packetlist_size).

Among them, max_packetlist_size is a predetermined data amount for limiting the maximum data amount that can be cached in the jitter buffer, max_packetlist_size can be set according to the actual needs, and setting it too large may result in an increase in the latency of the target network, and setting it too small may result in the jitter buffer having a data overflow and dropping packets.

Condition 2: The actual cached data amount (buffer_ms) for the first historical time period reduced, the reduced data amount (delta_ms) is greater than the predetermined change amount (such as 50 ms), and the actual cached data amount (buffer_ms) in the first historical time period is consistently greater than the first predetermined maximum data amount (high_limit) exceeds the first predetermined duration, and the actual buffered data amount (buffer_ms) in the first historical period is consistently greater than the second predetermined maximum data amount (highest_limit) for a duration exceeding the second predetermined duration.

Among them, the second predetermined duration is longer than the first predetermined duration, for example, the first predetermined duration is 100 ms, the second predetermined duration is 300 ms, etc.

The first predetermined maximum data amount (high_limit) and the second predetermined maximum data amount (highest_limit) are both determined based on the target delay (target_level) of the first historical time period, and the first predetermined maximum data amount is greater than the target delay in the first historical time period. The second predetermined maximum data amount is greater than the first predetermined maximum data amount, for example, high_limit=1.125*target_level, highest_limit=max(4*target_level, target_level+1500 ms), etc.

Condition 3: The actual cached data amount (buffer_ms) in the first historical time period is reduced, the reduced data amount is greater than the predetermined change amount (delta_ms), and the duration of the actual cached data amount (buffer_ms) in the first historical time period is consistently greater than the first predetermined maximum data amount (high_limit) exceeds the third predetermined duration, and the third predetermined duration is greater than the first predetermined duration. For example, the third predetermined duration is 500 ms.

That is, in the case where any one of the above conditions 1 to 3 is satisfied, then the target playback strategy is determined to be accelerated playback. It is to be understood that, in the case of satisfying the above conditions, it is determined that the actual amount of cached data in the jitter buffer is large, and by controlling the player to accelerate the playback of the audio, it can serve to reduce the data amount in the jitter buffer, which not only avoids the jitter buffer from overflowing with data and dropping packets, but also achieves the purpose of reducing the target network latency.

Optionally, in order to improve the user's viewing experience as much as possible under accelerated playback, the target playback policy may also include a target acceleration rate. After the above step A2, the above S206 may also include the following steps:

If the actual amount of cached data, change information of cached data and target delay in the first historical time period meet the above condition 1, the target acceleration rate is determined to be the first acceleration rate, that is, accelerated playback is performed at a larger acceleration rate.

If the actual amount of cached data, change information of cached data and target delay in the first historical period meet the above condition 2, then the target acceleration rate is determined to be the second acceleration rate, and the second acceleration rate is smaller than the first acceleration rate, that is, the accelerated playback is performed at a medium acceleration rate.

If the actual amount of cached data in the first historical time period, the change information of cached data and the target delay time satisfy the above condition 3, then the target acceleration rate is determined to be a third acceleration rate, and the third acceleration rate is smaller than the second acceleration rate, i.e., the accelerated playback is performed at a smaller acceleration rate.

Optionally, the above S206 may also include the following steps:

Step B1: Periodically determine the change information of cached data of the jitter buffer in the first historical time period based on the actual cached data amount in the jitter buffer in the first historical time period.

Among them, the first historical time period includes the historical time period before the current decision-making moment. The specific implementation manner of step B1 is similar to the specific implementation manner of step A1 above, and will not be described again.

Step B2: If the actual amount of cached data, the change information of cached data and target delay in the first historical period satisfy the predetermined deceleration condition, it is determined that the target playback strategy includes deceleration playback.

Among them, the predetermined deceleration conditions include at least one of the following conditions:

Condition 4: The actual buffered data amount (buffer_ms) in the first historical period continuously increases by a fourth predetermined duration, the increased data amount (delta_ms) being less than or equal to the predetermined amount of change, and the length of the interval between the current moment of decision-making and the last moment at which it was determined to take decelerated playback exceeds a fifth predetermined duration.

Among them, the predetermined change amount, the fourth predetermined duration and the fifth predetermined duration can be set according to actual needs. For example, the predetermined change amount is 50 ms, the fourth predetermined duration being 30 ms, the fifth predetermined duration being 20 ms, etc.

Condition 5: The actual cached data amount (buffer_ms) in the first historical time period increases, the increased data amount being less than or equal to the predetermined change amount, and the actual cached data amount (buffer_ms) in the first historical time period is less than the first minimum data amount threshold (low_limit).

Among them, the first minimum data amount threshold (low_limit) is three-fourths of the target delay (target_level) of the first historical time period, i.e., low_limit=0.75*target_level.

Condition 6: The actual cached data amount (buffer_ms) in the first historical time period increases, the increased data amount being less than or equal to the predetermined change amount, and the actual cached data amount (buffer_ms) in the first historical time period being less than the second minimum data amount threshold (lowest_limit).

Among them, the second minimum data amount threshold (lowest_limit) is one-half of the target delay (target_level) of the first historical time period, that is, lowest_limit=0.5*target_level.

In other words, in the case of satisfying any of the above conditions 4 to 6, then the target playback strategy is determined to be decelerated playback. It can be understood that in the case of satisfying the above conditions, it can be determined that the actual amount of cached data in the jitter buffer is small, and by controlling the player to decelerate the playback of the audio, the role of the player to read the audio data from the jitter buffer can be reduced to avoid the situation of no data playback, and the short decelerated playback does not affect the user's sense of hearing, which is conducive to improve the user's viewing experience.

Optionally, in order to ensure the continuity of audio playback, the above S206 may comprise the following steps:

Step C1: If the actual amount of cached data in the jitter buffer in the first historical time period is less than or equal to the target delay in the first historical time period, determine that the target playback strategy is packet loss compensation.

That is, if buffer_ms-target_level, the target playback strategy is determined to be PLC. It is understood that by this target playback strategy, the situation in which there is no audio data in the jitter buffer for the player to play can be avoided, which is conducive to improving the continuity of the audio playback, and to improving the viewing experience of the user.

Optionally, after the above C1, the method of audio playback control provided by embodiments in this specification may also comprise: determining the data amount to be compensated based on the actual amount of cached data and the target delay in the first historical time period, and based on the data amount to be compensated and the actual amount of cached data in the first historical time period, adjust the target delay in the first historical time period.

Among them, the data amount to be compensated refers to the data amount that requires packet loss compensation (PLC), which is estimated based on various PLC compensation algorithms commonly used in this field.

In order to further improve the continuity of audio playback and avoid giving users an intermittent listening experience, the target delay can be adjusted in the following ways:

If the data amount to be compensated exceeds the first predetermined amount of compensation data, and the actual amount of cached data in the first historical time period is greater than the data amount to be compensated, then it is determined whether there is a packet loss in the jitter buffer in the first historical time period; if so, the target delay is reduced.

Among them, the first predetermined compensation data amount can be set according to actual needs, for example, the first predetermined compensation data amount being 30 ms.

For example, if the data amount to be compensated exceeds the first predetermined amount of compensated data, and the actual amount of cached data for the first historical time period is greater than the data amount to be compensated, it can be determined that the network congestion has been relieved, and then one-half of the target delay can be determined as the new target delay in the event of a packet loss, i.e., th=0.5*th, wherein, remembering that th=target_level, which, in this way, can play the role of avoiding there is no audio data in the jitter buffer for the player to play, thus conducive to improving the continuity of the audio playback; of course, it is also possible to keep the target delay unchanged in the case of no packet loss.

If the data amount to be compensated exceeds the first predetermined amount of compensation data, and the actual data amount cached in the first historical time period is less than or equal to the data amount to be compensated, the maximum value of the target delay in the first historical time period and the second predetermined amount of compensation data is determined to be the new target delay.

Among them, the second predetermined compensation data amount is greater than the first predetermined compensation data amount. The second predetermined compensation data amount can be set according to actual needs. For example, the second predetermined compensation data amount is 300 ms.

For example, record th=target_level (target delay). If the data amount to be compensated exceeds the first predetermined compensation data amount and the actual cached data amount in the first historical period being less than or equal to the data amount to be compensated, then the new target delay is th=max(th, 300 ms). In this way, it can serve the function of avoiding no audio data in the jitter buffer for the player to play, thereby facilitating the improvement of the continuity of audio playback.

At S208, obtain audio data from the jitter buffer and play through the player, based on the target playback strategy.

Specifically, the out-frame controller at the receiver can obtain audio data from the jitter buffer and play the audio data according to the target playback strategy.

In the audio playback control method provided in one or more embodiments of the present specification, the receiver, from the network quality of service as a starting point, after estimating a target delay of the target network based on the IAT of the audio data packet sent by the sender, determines a target playback strategy for the player to perform the audio data playback based on the target delay of the target network and the actual amount of cached data in the jitter buffer, and then based on the target playback policy after the target delay and the actual amount of cached data in the jitter buffer of the target network, determine the target playback policy of the player for audio data playback, and then based on the target playback policy, obtain audio data from the jitter buffer and play it through the player, overall stability of audio playback.

Figure 4:
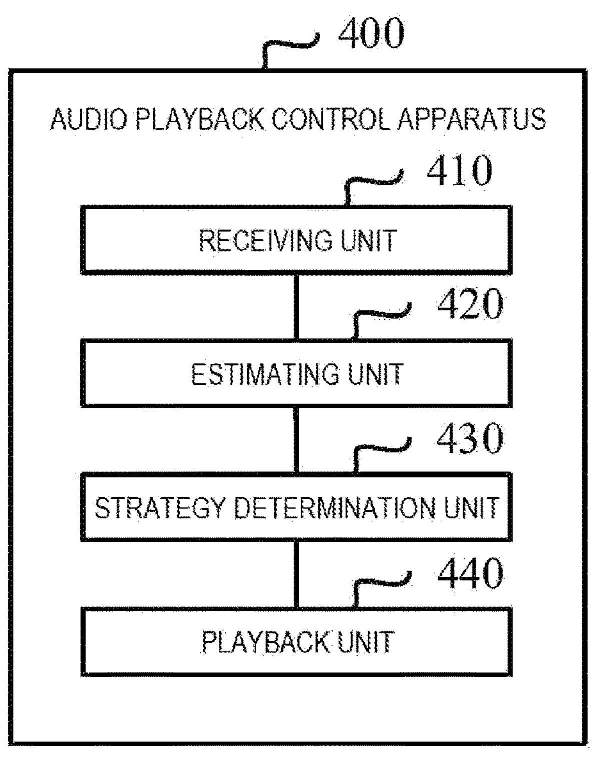
FIG. 4 is a schematic structural diagram of a device for audio playback control provided by an embodiment of this specification.

In addition, corresponding to the audio playback control method shown in FIG. 2 above, embodiments of the present specification also provide an audio playback control device. FIG. 4 is a schematic diagram of the structure of an audio playback control device 400 provided by the embodiments of the present specification, comprising:

A receiving unit 410, configured to receive an audio data packet sent by a sender through a target network and cache it in a jitter buffer to wait for a player to play;

An estimating unit 420, configured to estimate a target delay of the target network based on an inter-arrival time IAT of the audio data packet sent by the sender;

A strategy determination unit 430, configured to determine a target playback strategy of the player for the audio data playback based on the target delay of the target network and the actual cached data amount in the jitter buffer;

A playback unit 440, configured to obtain the audio data from the jitter buffer and play it through the player based on the target playback strategy.

Optionally, the strategy determination unit is specifically used to:

Periodically determine the change information of cached data of the jitter buffer in the first historical time period based on the actual cached data amount in the jitter buffer in the first historical time period, the first historical time period comprises the historical time period prior to a current decision moment;

If the actual cached data amount, the change information of cached data and the target delay in the first historical time period satisfy predetermined acceleration condition, determining the target playback strategy comprising accelerated playback;

Wherein, the predetermined acceleration condition comprises: the actual cached data amount in the first historical time period being greater than predetermined maximum cached data amount in the jitter buffer;

Alternatively, an actual cached data amount in the first historical time period reduces, a reduced data amount being greater than a predetermined change amount, a duration of an actual cached data amount in the first historical time period being continually greater than a first predetermined maximum data amount exceeding a first predetermined duration, and a duration of an actual cached data amount in the first historical time period being continually greater than a second predetermined maximum data amount exceeds a second predetermined duration, wherein the second predetermined duration is greater than the first predetermined duration, determining both of the first predetermined maximum data amount and the second predetermined maximum data amount based on a target delay in the first historical time period, and the first predetermined maximum data amount is greater than a target delay of the first historical time period, the second predetermined maximum data amount being greater than the first predetermined maximum data amount;

Alternatively, an actual cached data amount in the first historical time period reduces, a reduced data amount being greater than the predetermined change amount, a duration of an actual cached data amount in the first historical time period being continually greater than the first predetermined maximum data amount exceeding a third predetermined duration, the third predetermined duration being greater than the first predetermined duration.

Optionally, the target playback strategy also comprises a target acceleration rate;

The strategy determination unit is also used to:

If the actual amount of cached data in the first historical time period is greater than the predetermined maximum amount of cached data in the jitter buffer, then determine the target acceleration rate to be the first acceleration rate;

If an actual cached data amount in the first historical time period reduces, a reduced data amount being greater than a predetermined change amount, a duration of an actual cached data amount in the first historical time period being continually greater than the first predetermined maximum data amount exceeding the a predetermined duration, and a duration of the actual cached data amount in the first historical time period being continually greater than the second predetermined maximum data amount exceeding the second predetermined duration, determining the target acceleration rate as a second acceleration rate, the second acceleration rate being less than the first acceleration rate;

If an actual cached data amount in the first historical time period reduces, a reduced data amount being greater than the predetermined change amount, a duration of an actual cached data amount in the first historical time period being continually greater than the first predetermined maximum data amount exceeding the third predetermined duration, determining the target acceleration rate as a third acceleration rate, the third acceleration rate being less than the second acceleration rate.

Optionally, the strategy determination unit is specifically used to:

determining change information of cached data in the jitter buffer in the first historical time period periodically based on an actual cached data amount in the jitter buffer in the first historical time period, the first historical time period comprising a historical time period prior to a current decision moment the first historical time period comprises the historical time period prior to current the decision moment;

if an actual cached data amount, change information of cached data and a target delay in the first historical time period satisfy a predetermined deceleration condition, determining that the target playback strategy comprises decelerated playback;

Wherein, the predetermined deceleration condition comprises: an actual cached data amount in the first historical time period continually increasing for a fourth predetermined duration, an increased data amount being less than or equal to the predetermined change amount, and an interval duration between the current decision moment and a last moment of determining to take the decelerated playback exceeds a fifth predetermined duration;

Alternatively, an actual cached data amount in the first historical time period increasing, an increased data amount being less than or equal to the predetermined change amount, and an actual cached data amount in the first historical time period is less than a first minimum data amount threshold, the first minimum data amount threshold being three-quarters of a target delay in the first historical time period;

Alternatively, an actual cached data amount in the first historical time period increasing, an increased data amount being less than or equal to the predetermined change amount, and an actual cached data amount in the first historical time period is less than a second minimum data amount threshold, the second minimum data amount threshold being one-half of a target delay in the first historical time period.

Optionally, the strategy determination unit is specifically used to:

if an actual cached data amount in the jitter buffer in the first historical time period is less than or equal to a target delay in the first historical time period, determining that the target playback strategy is packet loss compensation, the first historical time period comprising a historical time period prior to a current decision moment.

Optionally, the estimation unit is also used to:

After the strategy determination unit determines that the target playback strategy is to perform the audio data packet compensation to the jitter buffer before playing, it determines the data amount to be compensated based on the actual cached data amount and the target delay in the first historical time period;

adjusting a target delay in the first historical time period based on the data amount to be compensated and an actual cached data amount in the first historical time period.

Optionally, the estimation unit adjusts the target delay in the first historical time period based on the data amount to be compensated and the actual cached data amount of the first historical time period, including:

if the data amount to be compensated exceeds a first predetermined compensation data amount and an actual cached data amount in the first historical time period is greater than the data amount to be compensated, determining whether packet loss occurs in the jitter buffer in the first historical time period;

if yes, reducing the target delay.

Optionally, the estimation unit adjusts the target delay of the first historical time period based on the data amount to be compensated and the actual cached data amount of the first historical time period, comprising:

if the data amount to be compensated exceeds the a predetermined compensation data amount and an actual cached data amount in the first historical time period is less than or equal to the data amount to be compensated, determining a maximum value of a target delay in the first historical time period and a second predetermined compensation data amount as a new target delay, wherein the second predetermined compensation data amount is greater than the first predetermined compensation data amount.

Optionally, the estimating unit estimates the target delay of the target network based on the inter-arrival time IAT of the audio data packets sent by the sender, comprising:

determining an estimated delay corresponding to a plurality of predetermined delay estimation algorithms respectively, based on the plurality of predetermined delay estimation algorithms and the IAT of the audio data packet received by the jitter buffer in a first historical time period, the first historical time period comprising a historical time period before a current decision moment, the plurality of predetermined delay estimation algorithms comprising: a probability histogram calculation method, a disordered histogram calculation method and a peak calculation method;

determining a target delay of the target network in the first historical time period, based on a maximum value of the estimated delays corresponding to the plurality of predetermined delay estimation algorithms respectively.

Optionally, the estimation unit determines the target delay of the target network in the first historical time period based on the maximum value of the estimated delays corresponding to the multiple predetermined delay estimation algorithms respectively, including:

if the maximum value is greater than a target delay in a second historical time period, determining whether packet loss occurs in the jitter buffer in the first historical time period, to obtain a packet loss detection result, wherein the second historical time period comprises a historical time period prior to a last decision moment;

determining a target delay of the first historical time period, based on the packet loss detection result, the maximum value, and an actual cached data amount in the first historical time period.

Optionally, the estimation unit determines the target delay of the first historical time period based on the packet loss detection result, the maximum value and the actual cached data amount of the first historical time period, including:

if packet loss occurs in the jitter buffer in the first historical time period, determining the maximum value as a target delay in the first historical time period;

if no packet loss occurs in the jitter buffer in the first historical time period, determining a product of the maximum value and a predetermined coefficient as a target delay of the first historical time period, the predetermined coefficient being a value greater than 0 and less than 1;

if an actual cached data amount in the first historical time period is greater than or equal to the maximum value, determining a minimum value of an actual cached data amount in the first historical time period and the maximum value as a target delay in the historical time period.

Optionally, the estimation unit determines the target delay of the target network in the first historical time period based on the maximum value of the estimated delays corresponding to the multiple predetermined delay estimation algorithms respectively, including:

if the maximum value is less than or equal to a target delay of a second historical time period, determining a target delay in the first historical time period, based on a target delay in the second historical time period, the interval time between a last decision moment and a current decision moment, and predetermined delay decreases rate, wherein the second historical time period comprises a historical time period prior to a last decision moment.

Obviously, the audio playback control device of the embodiments in this specification can be used as the execution subject of the audio playback control method shown in FIG. 2, and therefore can realize the functions of the audio playback control method in FIG. 2. Since the principles are the same, they will not be repeated here.

Figure 5:
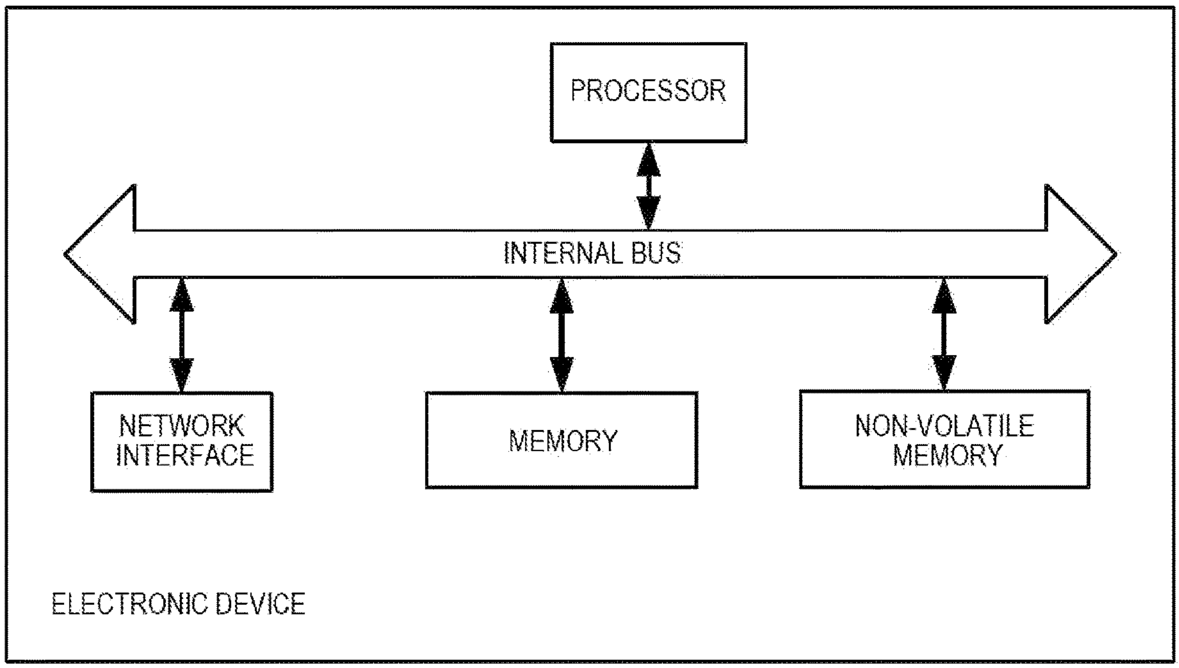
FIG. 5 is a schematic structural diagram of an electronic device provided by an embodiment of this specification.

FIG. 5 is a schematic diagram of the structure of an embodiment of an electronic device of the present specification. Referring to FIG. 5, at a hardware level, the electronic device includes a processor and optionally an internal bus, a network interface, and a memory. Wherein, the memory may comprise memory, such as a high-speed random-access memory (Random-Access Memory, RAM), and may also comprise non-volatile memory, such as at least 1 disk memory, and the like. Of course, the electronic device may also include other hardware required for operations.

The processor, network interface, and memory can be connected to each other via an internal bus, which can be an ISA (Industry Standard Architecture) bus, a PCI (Peripheral Component Interconnect) bus, or an EISA (Extended Industry Standard Architecture) bus, PCI (Peripheral Component Interconnect) bus, or EISA (Extended Industry Standard Architecture) bus. The said buses can be categorized as address buses, data buses, control buses, and so on. For ease of representation, only one bidirectional arrow is shown in FIG. 5, but this does not mean that there is only one bus or one type of bus.

A memory for storing a program. Specifically, the program may comprise program code, said program code comprising computer operating instructions. The memory may comprise memory and non-volatile memory and provides instructions and data to the processor.

The processor reads a corresponding computer program from the non-volatile memory into the memory and then runs it, forming an audio playback control device at a logical level. The processor, executes the program stored in the memory and is specifically used to perform the following operations:

Receive an audio data packet sent by a sender through a target network and cache it in a jitter buffer to wait fora player to play;

Estimate a target delay of the target network based on an inter-arrival time IAT of the audio data packet sent by the sender;

Determine a target playback strategy of the player for the audio data playback based on the target delay of the target network and the actual cached data amount of the jitter buffer;

Obtain the audio data from the jitter buffer and play it through the player based on the target playback strategy.

The method executed by the audio playback control device disclosed in the above embodiments shown in FIG. 2 of this specification can be applied to a processor, or implemented by the processor. The processor may be an integrated circuit chip that has signal processing capabilities. During the implementation process, each step of the above method can be completed by instructions in the form of hardware integrated logic circuits or software in the processor. The above-mentioned processor can be a general-purpose processor, including a central processing unit (CPU), a network processor (Network Processor, NP), etc.; it can also be a digital signal processor (Digital Signal Processor, DSP), dedicated integrated processor Circuit (Application Specific Integrated Circuit, ASIC), Field-Programmable Gate Array (FPGA) or other programmable logic devices, discrete gate or transistor logic devices, and discrete hardware components. The disclosed methods, steps and logical block diagrams in the embodiments of this specification can be implemented or executed. A general-purpose processor may be a microprocessor or the processor may be any conventional processor, etc. The steps of the method disclosed in conjunction with the embodiments of this specification can be directly implemented by a hardware decoding processor, or executed by a combination of hardware and software modules in the decoding processor. The software module can be located in random access memory, flash memory, read-only memory, programmable read-only memory or electrically erasable programmable memory, registers and other mature storage media in this field. The storage medium is located in the memory, and the processor reads the information in the memory and completes the steps of the above method in combination with its hardware.

It should be understood that the electronic devices of the embodiments in this specification can realize the functions of the audio playback control device in the embodiments shown in FIG. 2. Since the principles are the same, the embodiments in this specification will not be repeated here.

Of course, in addition to software implementation, the electronic equipment in this specification does not exclude other implementation methods, such as logic devices or a combination of software and hardware, etc. In other words, the execution subject of the following processing flow is not limited to each logical unit. It can also be hardware or logic devices.

This specification embodiment also proposes a computer-readable storage medium that stores one or more programs, and the one or more programs include instructions that when executed by a portable electronic device comprising a plurality of application programs, the portable electronic device can be enabled to perform the embodiments method shown in FIG. 2, and is specifically used to perform the following operations:

Receive an audio data packet sent by a sender through a target network and cache it in a jitter buffer to wait fora player to play;

Estimate a target delay of the target network based on an inter-arrival time IAT of the audio data packet sent by the sender;

Determine a target playback strategy of the player for the audio data playback based on the target delay of the target network and the actual cached data amount of the jitter buffer;

Obtain the audio data from the jitter buffer and play it through the player based on the target playback strategy.

Specific embodiments of this specification are described above. Other embodiments are within the scope of the attached CLAIMS. In some cases, the actions or steps documented in CLAIMS can be performed in a different order than in the embodiments and still achieve the desired results. Additionally, the processes depicted in the figures do not necessarily require the specific order shown, or sequential order, to achieve desirable results. Multitasking and parallel processing are also possible or may be advantageous in certain implementations.

In short, the above descriptions are only preferred embodiments of this specification and are not intended to limit the scope of protection of this specification. Any modifications, equivalent replacements, improvements, etc. made within the spirit and principles of this specification shall be included in the protection scope of this specification.

The systems, devices, modules or units described in the above embodiments can be implemented by computer chips or entities, or by products with certain functions. A typical implementation device is a computer. Specifically, the computer may be, for example, a personal computer, a laptop computer, a cellular phone, a camera phone, a smartphone, a personal digital assistant, a media player, a navigation device, an email device, a game console, a tablet computer, a wearable device, or A combination of any of these devices.

Computer-readable media includes both persistent and non-volatile, removable and non-removable media that can be implemented by any method or technology for storage of information. Information may be computer-readable instructions, data structures, modules of programs, or other data. Examples of computer storage media include, but are not limited to, phase change memory (PRAM), static random access memory (SRAM), dynamic random access memory (DRAM), other types of random access memory (RAM), and read-only memory. (ROM), electrically erasable programmable read-only memory (EEPROM), flash memory or other memory technology, compact disc read-only memory (CD-ROM), digital versatile disc (DVD) or other optical storage, Magnetic tape cassettes, tape disk storage or other magnetic storage devices or any other non-transmission medium can be used to store information that can be accessed by a computing device. As defined in this article, computer-readable media does not include transitory media, such as modulated data signals and carrier waves.

It should also be noted that the terms "comprises," "comprises," or any other variation thereof are intended to cover a non-exclusive inclusion, such that a process, method, article, or apparatus that includes a list of elements not only includes those elements, but also includes other elements are not expressly listed or are inherent to the process, method, article or equipment. Without further limitation, an element defined by the statement "comprises a . . . " does not exclude the presence of additional identical elements in a process, method, article, or device that includes the stated element.

Each embodiment in this specification is described in a progressive manner. The same and similar parts between each embodiment can be referred to each other. Each embodiment focuses on its differences from other embodiments. In particular, for system embodiments, since they are basically similar to method embodiments, the description is relatively simple. For relevant information, please refer to the partial description of method embodiments.

I claim:

1. A method of audio playback control, comprising:

receiving an audio data packet sent by a sender through a network and caching the audio data packet to a jitter buffer to wait for a player to play;

estimating a delay of the network in a first historical time period based on an inter-arrival time (IAT) of audio data packets received by the jitter buffer in the first historical time period, wherein the first historical time period is a historical time period before a current moment, and the estimating the delay of the network in the first historical time period based on the IAT of the audio data packets comprises:

computing a plurality of estimated delays based on a plurality of predetermined delay estimation algorithms and the IAT of the audio data packets received by the jitter buffer during the first historical time period, and determining the delay of the network in the first historical time period based on a maximum value among the plurality of estimated delays;

determining a playback strategy of the player to perform playback of audio data at the current moment based on the delay of the network in the first historical time period and an actual cached data amount in the jitter buffer in the first historical time period, wherein the playback strategy comprises controlling the player to accelerate or decelerate the playback of the audio data; and obtaining audio data from the jitter buffer and playing the audio data through the player based on the playback strategy.

2. The method of claim 1, wherein determining the playback strategy of the player comprises:

determining change information of cached data in the jitter buffer in the first historical time period periodically based on the actual cached data amount in the jitter buffer in the first historical time period;

if the actual cached data amount, the change information of cached data and the delay in the first historical time period satisfy a predetermined acceleration condition, determining that the playback strategy comprises accelerated playback;

wherein, the predetermined acceleration condition comprises anyone of the following:

the actual cached data amount in the first historical time period being greater than a predetermined maximum cached data amount in the jitter buffer; or the actual cached data amount in the first historical time period reduces, a reduced data amount being greater than a predetermined change amount, a duration of the actual cached data amount in the first historical time period being continually greater than a first predetermined maximum data amount exceeding a first predetermined duration, and the duration of the actual cached data amount in the first historical time period being continually greater than a second predetermined maximum data amount exceeds a second predetermined duration, wherein the second predetermined duration is greater than the first predetermined duration, determining both of the first predetermined maximum data amount and the second predetermined maximum data amount based on a target-delay in the first historical time period, and the first predetermined maximum data amount is greater than a target delay of the first historical time period, the second predetermined maximum data amount being greater than the first predetermined maximum data amount; or the actual cached data amount in the first historical time period reduces, a reduced data amount being greater than the predetermined change amount, the duration of the actual cached data amount in the first historical time period being continually greater than the first predetermined maximum data amount exceeding a third predetermined duration, the third predetermined duration being greater than the first predetermined duration.

3. The method of claim 2, wherein the target-playback strategy further comprises a target acceleration rate;

determining the playback strategy of the player further comprising:

if the actual cached data amount in the first historical time period is greater than a predetermined maximum cached data amount in the jitter buffer, determining the target acceleration rate as a first acceleration rate;

if the actual cached data amount in the first historical time period reduces, a reduced data amount being greater than a predetermined change amount, the duration of the actual cached data amount in the first historical time period being continually greater than a first predetermined maximum data amount exceeding a predetermined duration, and a duration of the actual cached data amount in the first historical time period being continually greater than a second predetermined maximum data amount exceeding a second predetermined duration, determining the target acceleration rate as a second acceleration rate, the second acceleration rate being less than the first acceleration rate; and if the actual cached data amount in the first historical time period reduces, a reduced data amount being greater than the predetermined change amount, the duration of the actual cached data amount in the first historical time period being continually greater than the first predetermined maximum data amount exceeding a third predetermined duration, determining the target acceleration rate as a third acceleration rate, the third acceleration rate being less than the second acceleration rate.

4. The method of claim 1, wherein determining the playback strategy of the player comprises;

determining change information of cached data in the jitter buffer in the first historical time period periodically based on the actual cached data amount in the jitter buffer in the first historical time period;

if the actual cached data amount, change information of cached data and the delay in the first historical time period satisfy a predetermined deceleration condition, determining that the playback strategy comprises decelerated playback;

wherein, the predetermined deceleration condition comprises anyone of the following:

the actual cached data amount in the first historical time period continually increasing for a fourth predetermined duration, an increased data amount being less than or equal to the predetermined change amount, and an interval duration between the current decision moment and a last moment of determining to take the decelerated playback exceeds a fifth predetermined duration; or the actual cached data amount in the first historical time period increasing, an increased data amount being less than or equal to the predetermined change amount, and an actual cached data amount in the first historical time period is less than a first minimum data amount threshold, the first minimum data amount threshold being three-quarters of a delay in the first historical time period; or the actual cached data amount in the first historical time period increasing, an increased data amount being less than or equal to the predetermined change amount, and an actual cached data amount in the first historical time period is less than a second minimum data amount threshold, the second minimum data amount threshold being one-half of a delay in the first historical time period.

5. The method of claim 1, wherein determining the playback strategy of the player comprises:

if the actual cached data amount in the jitter buffer in the first historical time period is less than or equal to a delay in the first historical time period, determining that the playback strategy is packet loss compensation.

6. The method of claim 5, wherein, after determining the playback strategy, the method further comprises:

determining the data amount to be compensated based on the actual cached data amount and the delay in the first historical time period; and adjusting the delay in the first historical time period based on the data amount to be compensated and the actual cached data amount in the first historical time period.

7. The method of claim 6, wherein adjusting the delay in the first historical time period based on a data amount to be compensated and the actual cached data amount in the first historical time period, comprises:

if the data amount to be compensated exceeds a first predetermined compensation data amount and the actual cached data amount in the first historical time period is greater than the data amount to be compensated, determining whether packet loss occurs in the jitter buffer in the first historical time period;

if the packet loss occurs in the jitter buffer in the first historical time period, reducing the delay.

8. The method of claim 6, wherein adjusting the delay in the first historical time period comprises:

if the data amount to be compensated exceeds the a predetermined compensation data amount and the actual cached data amount in the first historical time period is less than or equal to the data amount to be compensated, determining a maximum value of a delay in the first historical time period and a second predetermined compensation data amount as a new delay, wherein the second predetermined compensation data amount is greater than the first predetermined compensation data amount.

9. The method of claim 1, wherein the plurality of predetermined delay estimation algorithms comprises a probability histogram calculation method, a disordered histogram calculation method, and a peak calculation method.

10. The method of claim 1, further comprising:

if the maximum value is greater than a delay in a second historical time period, determining whether packet loss occurs in the jitter buffer in the first historical time period, to obtain a packet loss detection result, wherein the second historical time period comprises a historical time period prior to a last decision moment; and determining the delay of the first historical time period, based on the packet loss detection result, the maximum value, and the actual cached data amount in the first historical time period.

11. The method of claim 10, wherein determining the delay in the first historical time period based on the packet loss detection result, the maximum value and the actual cached data amount in the first historical time period, comprising:

if packet loss occurs in the jitter buffer in the first historical time period, determining the maximum value as a delay in the first historical time period;

if no packet loss occurs in the jitter buffer in the first historical time period, determining a product of the maximum value and a predetermined coefficient as a delay of the first historical time period, the predetermined coefficient being a value greater than 0 and less than 1; and if the actual cached data amount in the first historical time period is greater than or equal to the maximum value, determining a minimum value of the actual cached data amount in the first historical time period and the maximum value as the delay in the historical time period.

12. The method of claim 1, further comprising:

if the maximum value is less than or equal to a delay of a second historical time period, determining the delay in the first historical time period, based on the delay in the second historical time period, the interval time between a last decision moment and the current moment, and predetermined delay decreases rate, wherein the second historical time period comprises a historical time period prior to a last decision moment.

13. An electronic device, comprising:

a processor; and a memory disposed to store computer-executable instructions that, in response to being executed, cause the processor to perform operations comprising:

receiving an audio data packet sent by a sender through a network and cache the audio data packet in a jitter buffer to wait for a player to play;

estimating a delay of the network in a first historical time period based on an inter-arrival time (IAT) of audio data packets received by the jitter buffer in the first historical time period, wherein the first historical time period is a historical time period before a current moment, and the estimating the delay of the network in the first historical time period based on the IAT of the audio data packets comprises:

computing a plurality of estimated delays based on a plurality of predetermined delay estimation algorithms and the IAT of the audio data packets received by the jitter buffer during the first historical time period, and determining the delay of the network in the first historical time period based on a maximum value among the plurality of estimated delays;

determining a playback strategy of the player to perform playback of audio data at the current moment based on the delay of the network in the first historical time period and an actual cached data amount in the jitter buffer in the first historical time period, wherein the playback strategy comprises controlling the player to accelerate or decelerate the playback of the audio data; and based on the playback strategy, obtaining audio data from the jitter buffer and playing the audio data through the player.

14. The electronic device of claim 13, wherein determining the playback strategy of the player comprises:

determining change information of cached data in the jitter buffer in the first historical time period periodically based on the actual cached data amount in the jitter buffer in the first historical time period;

if the actual cached data amount, the change information of cached data and the delay in the first historical time period satisfy a predetermined acceleration condition, determining that the playback strategy comprises accelerated playback;

wherein the predetermined acceleration condition comprises any one of:

the actual cached data amount in the first historical time period being greater than a predetermined maximum cached data amount in the jitter buffer; or the actual cached data amount in the first historical time period reduces, a reduced data amount being greater than a predetermined change amount, a duration of the actual cached data amount in the first historical time period being continually greater than a first predetermined maximum data amount exceeding a first predetermined duration, and the duration of the actual cached data amount in the first historical time period being continually greater than a second predetermined maximum data amount exceeds a second predetermined duration, wherein the second predetermined duration is greater than the first predetermined duration, determining both of the first predetermined maximum data amount and the second predetermined maximum data amount based on a delay in the first historical time period, and the first predetermined maximum data amount is greater than a delay of the first historical time period, the second predetermined maximum data amount being greater than the first predetermined maximum data amount; or the actual cached data amount in the first historical time period reduces, a reduced data amount being greater than the predetermined change amount, the duration of the actual cached data amount in the first historical time period being continually greater than the first predetermined maximum data amount exceeding a third predetermined duration, the third predetermined duration being greater than the first predetermined duration.

15. The electronic device of claim 14, wherein the playback strategy further comprises a target acceleration rate, and wherein the operations playback strategy of the player further comprise:

if the actual cached data amount in the first historical time period is greater than a predetermined maximum cached data amount in the jitter buffer, determining the target acceleration rate as a first acceleration rate;

if the actual cached data amount in the first historical time period reduces, a reduced data amount being greater than a predetermined change amount, the duration of the actual cached data amount in the first historical time period being continually greater than a first predetermined maximum data amount exceeding a predetermined duration, and a duration of the actual cached data amount in the first historical time period being continually greater than a second predetermined maximum data amount exceeding a second predetermined duration, determining the target acceleration rate as a second acceleration rate, the second acceleration rate being less than the first acceleration rate; and if the actual cached data amount in the first historical time period reduces, a reduced data amount being greater than the predetermined change amount, the duration of the actual cached data amount in the first historical time period being continually greater than the first predetermined maximum data amount exceeding a third predetermined duration, determining the target acceleration rate as a third acceleration rate, the third acceleration rate being less than the second acceleration rate.

16. The electronic device of claim 13, wherein determining the playback strategy of the player comprises:

determining change information of cached data in the jitter buffer in the first historical time period periodically based on the actual cached data amount in the jitter buffer in the first historical time period;

if the actual cached data amount, change information of cached data and the delay in the first historical time period satisfy a predetermined deceleration condition, determining that the playback strategy comprises decelerated playback;

wherein the predetermined deceleration condition comprises: the actual cached data amount in the first historical time period continually increasing for a fourth predetermined duration, an increased data amount being less than or equal to the predetermined change amount, and an interval duration between the current decision moment and a last moment of determining to take the decelerated playback exceeds a fifth predetermined duration; or the actual cached data amount in the first historical time period increasing, an increased data amount being less than or equal to the predetermined change amount, and an actual cached data amount in the first historical time period is less than a first minimum data amount threshold, the first minimum data amount threshold being three-quarters of a delay in the first historical time period; or the actual cached data amount in the first historical time period increasing, an increased data amount being less than or equal to the predetermined change amount, and an actual cached data amount in the first historical time period is less than a second minimum data amount threshold, the second minimum data amount threshold being one-half of a delay in the first historical time period.

17. The electronic device of claim 13, wherein the playback strategy of the player comprises:

if the actual cached data amount in the jitter buffer in the first historical time period is less than or equal to a delay in the first historical time period, determining that the playback strategy is packet loss compensation.

18. The electronic device of claim 17, wherein, after determining the playback strategy, the operations further comprise:

determining the data amount to be compensated based on the actual cached data amount and the delay in the first historical time period; and adjusting the delay in the first historical time period based on the data amount to be compensated and the actual cached data amount in the first historical time period.

19. A non-transitory computer-readable storage medium, wherein the computer-readable storage medium stores one or more programs, and in response to the one or more programs being executed by a terminal device comprising a plurality of application programs, cause the terminal device performs operations comprising:

receiving an audio data packet sent by a sender through a network and cache the audio data packet to a jitter buffer to wait for a player to play;

estimating a delay of the network in a first historical time period based on an inter-arrival time (IAT) of audio data packets received by the jitter buffer in the first historical time period, wherein the first historical time period is a historical time period before a current moment, and the estimating the delay of the network in the first historical time period based on the IAT of the audio data packets comprises:

computing a plurality of estimated delays based on a plurality of predetermined delay estimation algorithms and the IAT of the audio data packets received by the jitter buffer during the first historical time period, and determining the delay of the network in the first historical time period based on a maximum value among the plurality of estimated delays;

determining a playback strategy of the player to perform playback of audio data at the current moment based on the delay of the network in the first historical time period and an actual cached data amount in the jitter buffer in the first historical time period, wherein the playback strategy comprises controlling the player to accelerate or decelerate the playback of the audio data; and based on the playback strategy, obtaining audio data from the jitter buffer and playing the audio data through the player.

* * * * *